J. M. MAYHEW.
CAR-STARTER.

No. 174,966. Patented March 21, 1876.

Witnesses.
S. W. Piper
L. W. Miller

James M. Mayhew
by his attorney
R. W. Eddy

UNITED STATES PATENT OFFICE.

JAMES M. MAYHEW, OF MANSFIELD, MASSACHUSETTS, ASSIGNOR TO ERASTUS M. REED AND JACOB A. BLAKE, OF SAME PLACE.

IMPROVEMENT IN CAR-STARTERS.

Specification forming part of Letters Patent No. 174,966, dated March 21, 1876; application filed February 21, 1876.

*To all whom it may concern:*

Be it known that I, JAMES M. MAYHEW, of Mansfield, of the county of Bristol and State of Massachusetts, have invented a new and useful Improvement in Car Brakes and Starters; and do hereby declare the same to be fully described in the following specification and represented in the accompanying drawings, of which—

Figure 1:
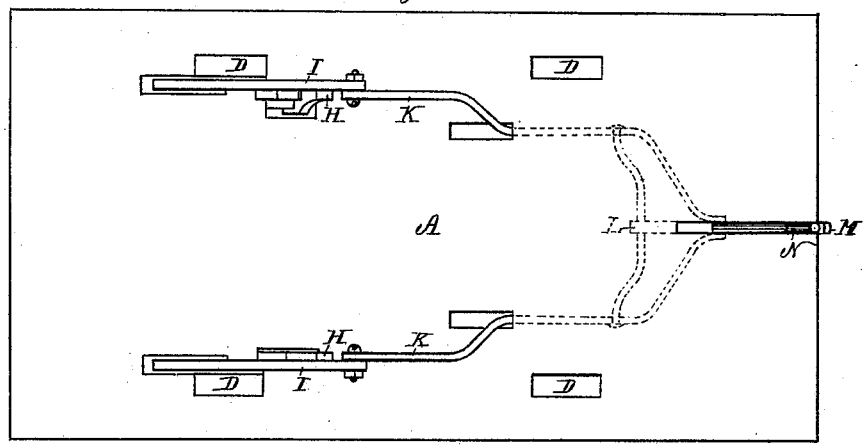
Figure 2:
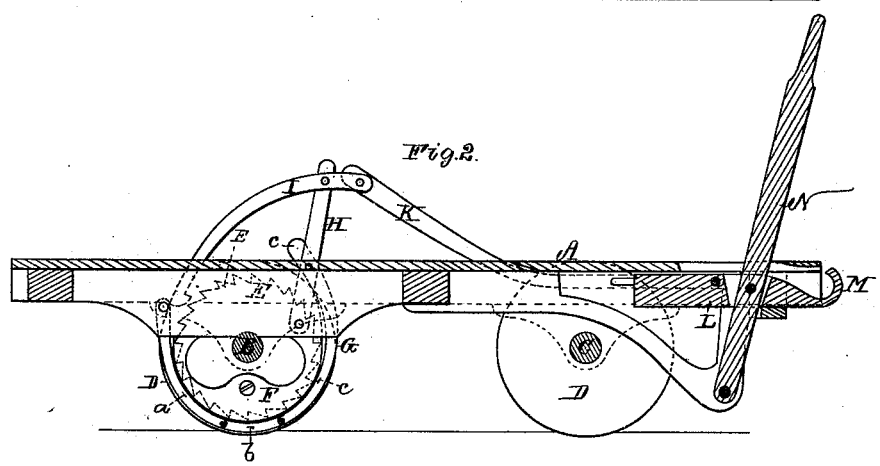
Figure 3:
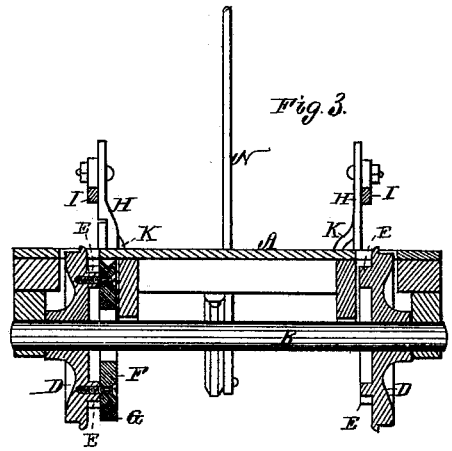

Figure 1 is a top view, and Fig. 2 a longitudinal section, of a horse-car truck with my invention. Fig. 3 is a transverse section taken through the rear axle.

It is of great advantage to have to horse-railway cars some means of relieving the horses from the great strain to which they are generally subjected in starting such cars.

My invention is intended for such purpose, or to enable the draft-animals to accomplish the starting of the car with a much less expenditure of force than results when the pole is directly attached to the platform, or a bracket extended therefrom.

In the drawings, A denotes the truck-platform; B and C, its axles, and D D D D the four wheels thereof. There is fixed to the inner side of one of the wheels D, concentrically with its axle, a ratchet-wheel, E, and to the inner side of the latter a brake-wheel, F, is attached. The drawings represent each rear wheel as having such a ratchet-wheel to it.

A brake, G, composed of a series of curved bars, *a b c*, hinged together, embraces the wheel F, and at one end is pivoted to the truck-frame, the other or upper end of said brake being pivoted to a carrying-lever, H, arranged as shown. The fulcrum of the said lever is at or near its lower end, and is supported by the truck-platform. Two of such levers are represented in the drawings, one for each of the rear wheels, each lever having pivoted to it, near its upper end, one of two draw or linked pawls, I I, that engage with the ratchet-wheels. At their inner ends their pawls are pivoted to two connection-rods, K K, which, at their front ends, are jointed to a slider, L, provided at its front end with a hook, M, and arranged with the truck-frame, and pivoted to a lever, N, applied to such frame, all being as shown.

On taking hold of the upper arm of the lever N, and moving it backward, not only will the brake be made to bind on the brake-wheel, but the draw-pawls will be forced backward upon and over their ratchet-wheels. Thus, while the car is in the act of being stopped by the brake, the draw-pawls will be set back upon the ratchet-wheels.

The pole of the draft-animals being hooked upon the hook M, the starting forward of the carriage may be effected by them alone, or by them and the driver, or by the driver alone, who, by taking hold of the lever N and pushing it forward, will cause the draw-pawls to act upon the ratchet-wheels in a manner to revolve the rear wheels and start the car forward.

After the pawls may have turned the wheels forward a certain distance such pawls will be drawn up out of action with the ratchet-wheels, which will be free to revolve with the main wheels as the car may be in movement.

To each pair of wheels there may be such a brake mechanism and starter, the levers N being at opposite ends of the platform.

A car-starter, as explained, may be used without the brake mechanism, as described, being applied to it, as specified. It may be used with one or both of a pair of wheels.

I claim—

1. The car-starter, substantially as described, composed of the lever N, hooked slide L, ratchet-wheel E, draw-pawl I, carrying-lever H, and connection-rod K, applied to each of the pair of rear wheels D D and the brake-frame, all essentially as set forth.

2. The combination of the brake-wheel F and brake G with the lever H, the ratchet E, and the draw-pawl I, all being applied to the car-platform and one of its wheels, substantially in manner and to operate as specified.

JAMES M. MAYHEW.

Witnesses:
R. H. EDDY,
J. R. SNOW.